(12) United States Patent
Sakadjian et al.

(10) Patent No.: US 9,458,838 B2
(45) Date of Patent: Oct. 4, 2016

(54) POWER GENERATION PLANT INTEGRATING CONCENTRATED SOLAR POWER RECEIVER AND PRESSURIZED HEAT EXCHANGER

(71) Applicant: Babcock & Wilcox Power Generation Group, Inc., Barberton, OH (US)

(72) Inventors: Bartev B Sakadjian, North Canton, OH (US); Thomas J Flynn, North Canton, OH (US); Shengteng Hu, Copley, OH (US); Luis G Velazquez-Vargas, Copley, OH (US); Mikhail Maryamchik, Fairlawn, OH (US)

(73) Assignee: The Babcock & Wilcox Company, Barberton, OH (US)

( * ) Notice: Subject to any disclaimer, the term of this patent is extended or adjusted under 35 U.S.C. 154(b) by 214 days.

(21) Appl. No.: 14/333,940

(22) Filed: Jul. 17, 2014

(65) Prior Publication Data

US 2016/0017869 A1    Jan. 21, 2016

(51) Int. Cl.

| | |
|---|---|
| *F03G 6/06* | (2006.01) |
| *F02C 1/05* | (2006.01) |
| *F24J 2/48* | (2006.01) |
| *F03G 6/04* | (2006.01) |
| *F02C 1/06* | (2006.01) |
| *F02C 1/10* | (2006.01) |
| *F24J 2/46* | (2006.01) |
| *F03G 6/00* | (2006.01) |

(52) U.S. Cl.
CPC ............... *F03G 6/064* (2013.01); *F02C 1/05* (2013.01); *F02C 1/06* (2013.01); *F02C 1/10* (2013.01); *F03G 6/04* (2013.01); *F03G 6/06* (2013.01); *F03G 6/065* (2013.01); *F03G 6/067* (2013.01); *F03G 6/068* (2013.01); *F24J 2/4649* (2013.01); *F24J 2/48* (2013.01); *F03G 2006/008* (2013.01); *Y02E 10/46* (2013.01)

(58) Field of Classification Search
CPC .......... F03G 6/064; F03G 6/067; F03G 6/06; F03G 6/065; F02C 1/06; F02C 1/10; F02C 1/05; F24J 2/48; F24J 2/4649; Y02E 10/46
USPC .................. 60/641.8, 641.15, 650, 682–684
See application file for complete search history.

(56) References Cited

U.S. PATENT DOCUMENTS

| | | | | |
|---|---|---|---|---|
| 4,215,553 A | * | 8/1980 | Poirier ...................... | F02C 1/05 165/104.34 |
| 4,309,980 A | * | 1/1982 | McCormack ............ | C09K 5/16 126/263.05 |

(Continued)

*Primary Examiner* — Hoang Nguyen
(74) *Attorney, Agent, or Firm* — Eric Marich; Christopher L. Smith

(57) ABSTRACT

A power plant includes a solar receiver heating solid particles, a standpipe receiving solid particles from the solar receiver, a pressurized heat exchanger heating working fluid by heat transfer through direct contact with heated solid particles flowing out of the bottom of the standpipe, and a flow path for solid particles from the bottom of the standpipe into the pressurized heat exchanger that is sealed by a pressure P produced at the bottom of the standpipe by a column of heated solid particles of height H. The flow path may include a silo or surge tank comprising a pressure vessel connected to the bottom of the standpipe, and a non-mechanical valve. The power plant may further include a turbine driven by heated working fluid discharged from the pressurized heat exchanger, and a compressor driven by the turbine.

30 Claims, 7 Drawing Sheets

(56) References Cited

U.S. PATENT DOCUMENTS

| | | | | | |
|---|---|---|---|---|---|
| 4,727,930 | A | * | 3/1988 | Bruckner | F02C 1/05 165/104.17 |
| 6,237,337 | B1 | * | 5/2001 | Bronicki | F01K 23/10 60/39.182 |
| 6,510,695 | B1 | * | 1/2003 | Fisher | F02C 6/10 60/39.12 |
| 2008/0196410 | A1 | * | 8/2008 | Primlani | F02C 1/05 60/641.15 |
| 2013/0284163 | A1 | * | 10/2013 | Flamant | B01J 8/1809 126/634 |
| 2014/0298822 | A1 | * | 10/2014 | Ma | F03G 6/067 60/783 |
| 2014/0311479 | A1 | * | 10/2014 | Maryamchik | F24J 2/4649 126/714 |

* cited by examiner

POWER GENERATION PLANT INTEGRATING CONCENTRATED SOLAR POWER RECEIVER AND PRESSURIZED HEAT EXCHANGER

The United States Government may have certain rights to this invention pursuant to contract number DE-AC36-08GO28308 between the United States Department of Energy and Alliance For Sustainable Energy, LLC. This invention was developed under subcontract ZGJ-3-23315-01 between Alliance For Sustainable Energy, LLC. and Babcock & Wilcox Power Generation Group, Inc. under contract number DE-AC36-08GO28308.

BACKGROUND

The following pertains to the power generation arts, concentrated solar power generation arts, pressurized heat exchanger arts, and related arts.

One known power generation technology is concentrated solar power (CSP), which in a design includes a field of heliostats concentrating solar power onto a (typically tower-mounted) solar receiver. Granular solid particles flow through the solar receiver, and absorb energy from the concentrated light and are thus heated. The hot flowing particles are fed into a fluidized-bed boiler to generate working fluid at elevated pressure for driving an electrical generator turbine. Some such solar concentrators are described, by way of non-limiting illustrative example, in Ma, U.S. Pub. No. 2013/0257056 A1 published Oct. 3, 2013 which is incorporated herein by reference in its entirety, and in Ma et al., U.S. Pub. No. 2013/0255667 A1 published Oct. 3, 2013 which is incorporated herein by reference in its entirety, and in Maryamchik et al., "Concentrated Solar Power Solids-Based System", U.S. Ser. No. 14/250,160 filed Apr. 10, 2014 which is incorporated herein by reference in its entirety.

BRIEF SUMMARY

In some aspects disclosed herein, a power plant comprises a solar receiver configured to heat solid particles, a standpipe extending downward from the solar receiver to receive solid particles from the solar receiver, the standpipe having a height sufficient to support a column of heated solid particles of height H, a pressurized heat exchanger configured to operate at an elevated pressure higher than atmospheric pressure to heat working fluid flowing through the pressurized heat exchanger by heat transfer from heated solid particles flowing out of the bottom of the standpipe, and a flow path for solid particles from the bottom of the standpipe into the pressurized heat exchanger that is configured to be sealed by a pressure P produced at the bottom of the standpipe by a column of heated solid particles of the height H. The pressurized heat exchanger may comprise a pressurized fluidized bed heat exchanger. The flow path may include a silo or surge tank comprising a pressure vessel connected to the bottom of the standpipe. The flow path may include a non-mechanical valve having no moving parts and operating by agitation of solid particles in the valve by flow of working fluid. The power plant may further include a turbine operatively connected with the pressurized heat exchanger to be driven by heated working fluid discharged from the pressurized heat exchanger, and a compressor driven by the turbine to drive working fluid through the pressurized heat exchanger to define a thermodynamic cycle driven at least in part by concentrated solar power (CSP) comprising thermal energy deposited in the solid particles heated by the solar receiver. In some embodiments the compressor driven by the turbine to drive working fluid through the pressurized heat exchanger defines a Brayton cycle driven at least in part by CSP comprising thermal energy deposited in the solid particles heated by the solar receiver. In some embodiments the pressure P produced at the bottom of the standpipe by a column of heated solid particles of the height H is at least 5 atm.

In some aspects disclosed herein, a method comprises: heating solid particles in a solar receiver; forming heated solid particles discharged by the solar receiver into a stack of height H by gravity feed from the solar receiver; transferring solid particles from the bottom of the stack of height H into a pressurized heat exchanger wherein the transferring includes sealing against the gas pressure in the pressurized heat exchanger by pressure produced by the weight of the stack of height H; and, in the pressurized heat exchanger, transferring heat from the solid particles to a working fluid at an elevated pressure of at least 5 atm. The method may further comprise driving a turbine using the working fluid heated by the transfer of heat from the solid particles in the pressurized heat exchanger, and circulating the working fluid through the pressurized heat exchanger using a compressor driven by the turbine whereby a thermodynamic cycle is defined that is driven by the heating of solid particles in the solar receiver. The working fluid heated by the transfer of heat from the solid particles in the pressurized heat exchanger may be further heated by a combustion process, which further drives the thermodynamic cycle.

In further aspects disclosed herein, a concentrated solar power solids-based system comprises: a solar receiver configured to heat a granulated solid medium comprising granulated solid particles; a pressurized heated solids storage configured to store the granulated solid medium after heating by the solar receiver; a pressurized heat exchanger configured to transfer heat from the granulated solid medium to a gaseous medium; a flow path connected to feed the granulated solid medium heated by the solar receiver to the pressurized heat exchanger; a compressor connected to supply the gaseous medium to the pressurized heat exchanger; a conveyor configured to transport the granulated solid medium after heat transfer to the gaseous medium in the pressurized heat exchanger from the pressurized heat exchanger to the solar receiver; a gas turbine operatively connected to be driven by the gaseous medium heated in the pressurized heat exchanger; and a standpipe disposed in the path of the granulated solid medium from the solar receiver to the pressurized heated solids storage. The standpipe has a height sufficient to hold a stack of granulated solid medium of height H that is sufficient to provide a seal against the pressure in the heated solids storage. In some embodiments the bottom end of the standpipe is at least partially surrounded by the pressurized heated solids storage, and at least one fluidizing nozzle is located in the pressurized heated solids storage. In some embodiments the pressurized heat exchanger comprises a stack of trays, each tray supporting a bed of solids, the trays connected to allow the granulated solid medium to flow downward through the trays and the gaseous medium to flow upward through the trays.

These and other non-limiting aspects and/or objects of the disclosure are more particularly described below.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention. This disclosure includes the following drawings.

DETAILED DESCRIPTION OF THE PREFERRED EMBODIMENTS

Figure 1:
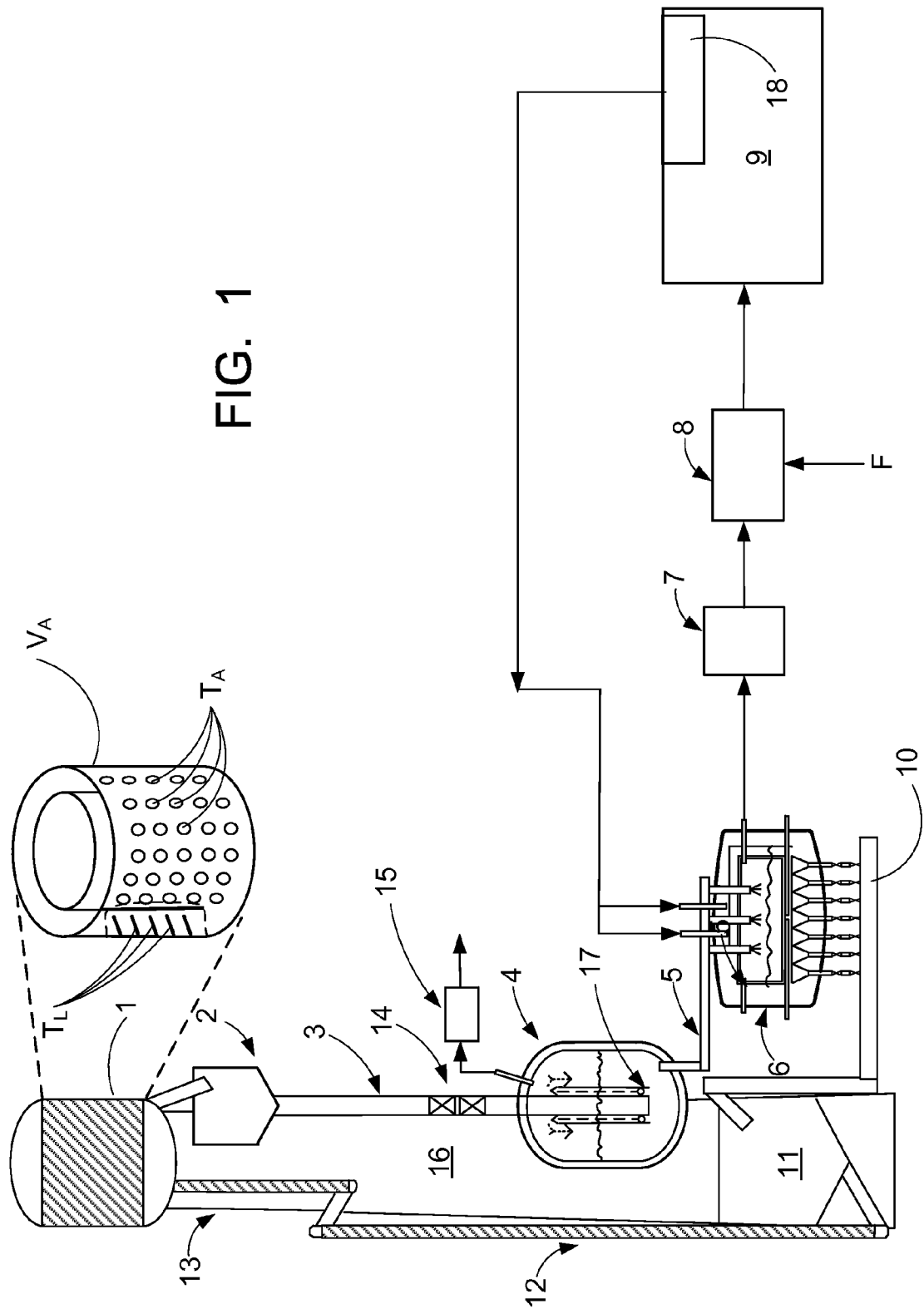
FIGS. 1-3 diagrammatically show illustrative power generation plant embodiments.

A more complete understanding of the processes and apparatuses disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

A value modified by a term or terms, such as "about" and "substantially," may not be limited to the precise value specified.

It should be noted that many of the terms used herein are relative terms. For example, the terms "interior", "exterior", "inward", and "outward" are relative to a center, and should not be construed as requiring a particular orientation or location of the structure.

The terms "horizontal" and "vertical" are used to indicate direction relative to an absolute reference, i.e. ground level. However, these terms should not be construed to require structures to be absolutely parallel or absolutely perpendicular to each other. For example, a first vertical structure and a second vertical structure are not necessarily parallel to each other.

The term "plane" is used herein to refer generally to a common level, and should be construed as referring to a volume, not as a flat surface.

To the extent that explanations of certain terminology or principles of the solar receiver, boiler and/or steam generator arts may be necessary to understand the present disclosure, the reader is referred to Steam/its generation and use, 40th Edition, Stultz and Kitto, Eds., Copyright 1992, The Babcock & Wilcox Company, and to Steam/its generation and use, 41st Edition, Kitto and Stultz, Eds., Copyright 2005, The Babcock & Wilcox Company, the texts of which are hereby incorporated by reference as though fully set forth herein.

With reference to FIG. 1, a power plant combines a concentrated solar power (CSP) system with a pressurized fluidized bed heat exchanger and an optional additional combustor to generate compressed air (or other working fluid at elevated pressure such as steam) for driving a gas turbine. A solar receiver 1 receives thermal flux from a heliostat field (not shown) surrounding the solar receiver 1. To provide a direct line-of-sight with the heliostats, the solar receiver 1 may be supported at an elevated position, for example on a tower 16 which may, for example, be at hundreds of feet in elevation, although greater or lesser elevations are contemplated. The thermal flux from the heliostat field heats up solid particles in the solar receiver 1. The solar receiver is designed to heat solid particles to a desired hot temperature, for example contemplated in some embodiments to be on the order of 800° C. or greater. Some suitable solar receiver designs are disclosed, by way of illustrative example, in Ma, U.S. Pub. No. 2013/0257056 A1 published Oct. 3, 2013 which is incorporated herein by reference in its entirety, and in Ma et al., U.S. Pub. No. 2013/0255667 A1 published Oct. 3, 2013 which is incorporated herein by reference in its entirety, and in Maryamchik et al., "Concentrated Solar Power Solids-Based System", U.S. Ser. No. 14/250,160 filed Apr. 10, 2014 which is incorporated herein by reference in its entirety. In one suitable embodiment (shown in FIG. 1 inset), the solar receiver 1 comprises an annular volume $V_A$ through which granular solid particles flow downward, which further includes light-channeling tubes $T_L$ (shown in the inset by partial cutaway of the annular volume $V_A$) having apertures $T_A$ at the outer surface of the annular volume to receive light from the heliostat field and extending into the annular volume $V_A$ so that the downward flowing granular solid particles pass over the light-channeling tubes to absorb solar thermal energy. After passing downward through the solar receiver 1, the heated particles are collected in a solids collector 2. FIG. 1 diagrammatically shows this collector 2; in some embodiments the collector 2 is an annular element so as to collect particles from the entire circumference of the annular solar receiver 1.

The solar receiver 1 and the collector 2 are not pressurized components, and operate at atmospheric pressure. The collector 2 is connected at its lower port by gravity-feed into a standpipe 3 which in turn gravity feeds into a hot silo 4, which serves as a reservoir that provides thermal energy storage to facilitate operation of the plant after sundown. Additionally, however, the standpipe 3 provides pressurization to the particles at is lower end, that is, in the hot silo 4. The pressure seal between the solar receiver 1 and the hot solids storage (e.g. silo 4) is provided by a column of solid particles in the standpipe 3 The pressure seal is a function of the height of the solid particles column in the standpipe 3, the temperature of operation, the material of the particles, and the geometric properties (e.g. packing factor) of the particles. A suitable seal is provided by ensuring that the solid particles move down the pipe in the packed-bed regime, i.e. without fluidizing the particles in the standpipe. Fluidization would start when gas pressure under the stack of solids becomes equal to the pressure from the weight of these solids, which is a ratio of the solids weight to the plan area of the stack. Therefore, the higher the desired gas (air) pressure for the turbine operation, the higher the stack of solids should be for providing the pressure seal.

To this end, flow of the granulated solid particles through the power plant, and in particular between the collector 2 and the hot silo 4, is controlled in order to maintain a column of solid particles in the standpipe 3 at a height (designated herein without loss of generality as H) that is sufficient to provide the desired pressure at the bottom of the standpipe 3. Treating the granulated solid particles as a quasi-fluid medium (where the term "quasi-fluid" as used herein indicates the granulated solid particles are being treated like a fluid, for example having some pressure, flow rate, and so forth, for descriptive or analysis purposes, while neglecting the discrete, granulated nature of the particles), the requisite height to provide a given pressure is given by $P = g \int_H \rho(h) dh$ where g is the gravitational acceleration (typically 9.81 m/s$^2$) and $\rho(h)$ is the density of the solid particle quasi-fluid at elevation (i.e. height) h along the column. In general, $\rho(h)$ could vary with elevation due to compression—if the solid particle quasi-fluid is treated as an incompressible fluid, then pressure $P = \mu g H$. In this way, the reservoir of hot particles in the hot silo 4 is maintained at the desired pressure P, and as a consequence the hot silo 4 is suitably constructed as a pressure vessel designed to contain the hot particles at pressure P.

With continuing reference to FIG. 1, the hot particles collected and maintained at pressure P in the hot silo 4 are transferred to a pressurized heat exchanger 6 also designed to operate at (or relatively near to) the pressure P. In general, this transfer could be accomplished using a conventional mechanical valve having a motor-driven or pneumatically-driven valve actuator. However, such a valve may potentially exhibit low reliability due to factors such as the high temperature and pressure of the solid particles and the granulated nature of the solid particle quasi-fluid. Accordingly, in a preferred embodiment the transfer of hot solid particles from the hot silo 4 to the pressurized heat exchanger 6 is performed using a non-mechanical valve, such as an illustrative L-valve 5, that has no moving parts and operates based on agitation of the solid particles in the valve by flow of air or other working fluid. Instead of the illustrative L-valve, another non-mechanical valve such as a J-valve can also be used. The illustrative L-valve 5 advantageously enables the flow of solid particles through the L-valve 5 to be regulated while simultaneously maintaining a pressure seal by adjusting the flow rate of aeration air to the L-valve 5. The L-valve 5 provides an independent control of the solids flow through the fluid bed heat exchanger 6 to optimize thermal performance of the heat exchanger 6. While the solids flow control through the heat exchanger is driven by the plant load demand, the solids flow through the solar receiver is maintained in correspondence with the solar activity. This solids flow is regulated by adjusting the speed of conveyors 12, 13 that lift the solid particles from the discharge of a cold silo 11 to the top of the solar receiver 1.

The pressurized heat exchanger 6 extracts heat from the hot particles to pressurized air flowing through the heat exchanger 6. In typical fluidized beds, heat transfer between the solids and the heated media, such as steam, occurs across heat absorption surface, such as tubes. Requirements for providing enough room for placing adequate heating surface within the bed dictate the bed height and plan area. By contrast, in the illustrative pressurized heat exchanger 6 direct contact of the air and particles provides good heat transfer at significantly lower bed volume requirements. This enables a significant reduction in the required bed height, and eliminates the need for plan area/bed volume associated with in bed surface (where indirect heat transfer is applied). These modifications lead to cost savings while reducing solids carryover. Operating the heat exchanger 6 at an elevated pressure (that is, above atmospheric pressure, in some embodiments 10-20 atm, but not limited only to this range) allows an additional reduction in plan area and consequently a significant reduction in cost.

By performing the heat transfer via direct contact between the air and the hot solid particles, the heat exchanger 6 raises the temperature of the air (or, more generally, some other working fluid such as gas or steam) to a desired high temperature (700° C. or higher in some contemplated embodiments) without the need for costly high alloy metal in-bed surface/pressure parts.

In an illustrative embodiment, the heat exchanger 6 is a Pressurized Fluidized Bed Heat Exchanger (PFB-HX), which comprises a pressure vessel designed to operate at elevated pressures in order to work with a desired Brayton cycle. For example the pressure of the vessel may be on the order of 10-20 atm (but not limited only to this range). Concomitantly the pressure P produced by the column of solid particles in the standpipe 3 is in the same range, e.g. at least 5 atm in some embodiments, and in the range 10-20 atm in some embodiments, so that the incoming solid particles quasi-fluid is at a pressure comparable with that of the heat exchanger 6. This avoids the need for a lock hopper type system for introducing the solid particles into the chamber while maintaining a pressure seal, which would be difficult to implement since the particles are at elevated temperature and preferably have large volumetric flow. To handle these temperatures and flow volumes, the valves of a lock hopper would need to handle hot solids and also would need to cycle rapidly. In the power plant of illustrative FIG. 1, the use of mechanical valves (such as in a lock hopper type system) at the inlet of the pressurized heat exchanger 6 are avoided. Instead, the pressure seal is achieved by allowing the system to build the solids level in the standpipe 3, so as to generate the pressure P at the bottom of the standpipe 3.

The standpipe 3 (or at least its lower end), the hot silo 4, and the L-valve 5 are at an elevated pressure. Therefore, these components 3, 4, 5 are suitably constructed as pressure vessels capable of handling the design pressure P. The pressure seal achievable using the standpipe 3 is a function of the height of the standpipe 3, the temperature of operation and the material(s) comprising the granulated solid particles. The particles material(s) are selected to provide the desired heat transfer properties, flowability, fluidization characteristics, and stability at the high operating temperature of the solar receiver 1 and the heat exchanger 6. The particle density also affects the pressure P achieved by a column of solid particles of height H in the standpipe 3, since the quasi-fluid density $\rho$ depends on both the density of the solid particles and the packing factor of the particles. (For example, if the particles have density $\rho_d$ with a packing factor PF which is less than one, for example PF=0.74 for a close-packed structure of spherical particles, then the density of the solid particles quasi-fluid is $\rho = \rho_d \times PF$). Some suitable materials for the granulated solid particles include, but are not limited to, sand, high silica sand, quartz, alumina, alumino silicates, calcined flint, clay type materials, minerals such as hematite, illemenite, refractory-type materials such as zirconia, titania, zirconia/titania containing particles, or so forth, and various mixtures thereof. As one illustrative example, Illemenite offers advantageous properties while also having higher particle densities than sand or high silica sand, yielding a higher quasi-fluid density $\rho$ and consequently a shorter column height H to achieve a given pressure P at the bottom of the standpipe 3.

With continuing reference to FIG. 1, heated air exiting from the heat exchanger 6 flows to the turbine island. Prior to entering the turbine 9, particulates that may still be present in the air are preferably removed at a particulate control component 7. Design measures can also be taken to reduce the concentration of particulates entrained in the air exiting the heat exchanger 6. For example, the velocity of the air in the heat exchanger 6 can be controlled, and/or a disengagement zone provided above the bed, so as to remove entrained particulates. The control of attrition and generation of fines is also an aspect of the design for particulate suppression, as is the particle material selection. The remaining particulate that is carried by the hot air exiting the heat exchanger 6 is preferably cleaned using the particle control component 7, which may for example comprise cyclones, hydrocyclones, high temperature ceramic candle filters, sintered metal particulate control devices, or so forth. In an alternative approach, particulate control equipment such as cyclones/hydrocyclones or candle filters may be integrally incorporated into the heat exchanger 6 to take advantage of a common pressure boundary (pressure vessel).

Hot air leaving the particulate control component 7 then goes through an optional combustor 8 which further increases the temperature of the pressurized air by combusting fuel F, such as natural gas prior to sending it to the turbine block 9. In conventional combustors, such as gas turbine combustors or natural gas burners, the temperature of the inlet air is relatively low which protects metal components of the combustor. By contrast, the optional combustor 8 receives inlet air from the heat exchanger 6 at an elevated temperature (about 700° C. or higher in some contemplated embodiments). The combustor 8 may suitably comprise a catalytic type combustor with the catalyst mounted on a substrate suitable for high temperature operation, such as a refractory ceramic substrate. On the other hand, since the air is already heated to a high temperature before entering the combustor 8, the amount of additional heat that needs to be provided by the combustor 8 is reduced, and so less fuel F (e.g. natural gas in the illustrative example, or another combustible fuel such as liquefied petroleum gas, gasoline, biodiesel, or so forth) is needed to attain a desired elevated temperature at the output of the combustor 8. Moreover, if the temperature at the outlet of the heat exchanger 6 is at the desired elevated temperature, then the combustor 8 may be omitted entirely. While the illustrated embodiment employs a combustion chamber 8 that is separate from the pressurized heat exchanger 6, in some alternative embodiments it is contemplated to combust a fuel directly in the pressurized heat exchanger to attain a desired elevated temperature at the outlet of the pressurized heat exchanger.

Particulates that have been cooled by the incoming air in the heat exchanger 6 are captured and removed from the bottom of the heat exchanger 6 by hoppers, and carried into the cold silo 11 using a solids conveying system 10. The solids discharged from the heat exchanger 6 are further cooled, for example to a temperature on the order of 450° C. or lower in some contemplated embodiments which optimizes heat recovery and allows the use of low-cost carbon steel in the downstream conveying components. Particles from the cold silo 11 are ready to be delivered back to the top of the solar receiver 1 using bucket elevators 12, 13 or another solids conveyance device. In some embodiments, prior to sending the solids back to the solar receiver 1 (or prior to being delivered to the cold storage silo 11), the solids are passed over a vibrating screen to reject any oversized material that might otherwise plug the narrow flow passages in the solar receiver 1.

The standpipe 3 is suitably constructed as a refractory lined pipe (or multiple such pipes) with a height of several hundred feet (more generally, a height greater than the height H of the solid particles column needed to obtain the desired pressure P at the bottom of the standpipe 3). The standpipe 3 optionally contains internal components such as valves 14, and the standpipe 3 does not necessarily have to have a constant cross-section over its entire height. The illustrative internal valves 14 operate as "check" valves that prevent solids backflow in case of a fluctuation or a pulse in any of the equipment downstream of the standpipe 3, prevent spillage of hot materials into the environment. The valves 14 may be placed at a suitable elevation in the standpipe—the pressure at the valves 14 due to the column of solid particles above the valves decreases with increasing elevation of the placement of the valves 14. The valves 14 can, by way of illustrative example, be iris-type ceramic valves of a type used in industry to restrict the flow of solids-laden gas or the flow of solids in a moving packed bed, as such valves can handle high temperature and are erosion resistant. The illustrative valves 14 are not used to regulate solids flow or provide a tight shut-off, and so they cannot be used in the place of the non-mechanical valve 5 for high temperature operation.

The illustrative hot silo 4 includes a vent for an aeration air used to facilitate solids flow from the standpipe 3 into the hot silo 4. The vent can be equipped with a hot filter 15 to prevent release of hot solid particles to the atmosphere, if the aeration air is vented to the atmosphere. Alternatively, the vent can be connected to the top of the pressurized heat exchanger 6. In this case the aeration air will be directed through the heat exchanger filters, and the hot filter 15 can be omitted. The bottom end of the standpipe 3 is immersed in the inventory of solid particles in the hot silo 4. If the solids in the vicinity of the bottom of the standpipe 3 are slumped, i.e. represent a packed bed, no solids movement from the standpipe into the silo is possible. To ensure smooth particle flow from the bottom end of the standpipe 3 into the inventory of solid particles contained in the hot silo 4, the illustrative design includes one or more fluidization nozzles 17, for example fluidization ring 17 surrounding the bottom end of the standpipe 3. An aeration fluid injected into the fluidization ring 17 agitates the solid particle inventory in proximity to the bottom end of the standpipe 3 to facilitate fluidized particle flow at this junction. More generally, the fluidization nozzle can have a geometry other than the ring geometry of the fluidization ring 17. The aeration fluid is typically air. Alternatively, the aeration fluid could be a combustible mixture of air and gaseous fuel, such as but not limited to natural gas, methane or propane, to further heat the solids in the hot silo. This alternative would be especially effective during periods of low solar thermal flux to the solar receiver 1.

Various components of the power plant require a supply of compressed air (or other working fluid at elevated pressure, such as steam). Compressed air is input to the heat exchanger 6, and in some preferred embodiments the thermodynamic cycle entails driving an air compressor 18 using the turbine (directly or via electricity generated by an electrical generator that is driven by the turbine) as part of the gas turbine power generation sub-system 9 and feeding compressed air from the air compressor 18 into the heat exchanger 6 to complete the thermodynamic cycle. In some contemplated embodiments, the thermodynamic cycle is an approximation of a Brayton cycle, and the thermodynamic cycle of the illustrative embodiments is referred to herein as a Brayton cycle. The compressor 18 of the Brayton cycle also suitably supplies compressed air (or other working fluid at elevated pressure) for other purposes, such as to provide aeration for the fluidization ring 17 in the hot silo 4, for operating the L-valve 5, and so forth. Similarly, power generated in the gas turbine power generation sub-system 9 from a working fluid at elevated pressure and temperature, or mechanical energy obtained from the rotating shaft of the turbine, or electrical power obtained by an optional electrical generator (not shown) coupled with the turbine, or so forth is suitably used to operate the bucket elevators 12, 13 of the solar phase of the integrated power plant.

Figure 2:
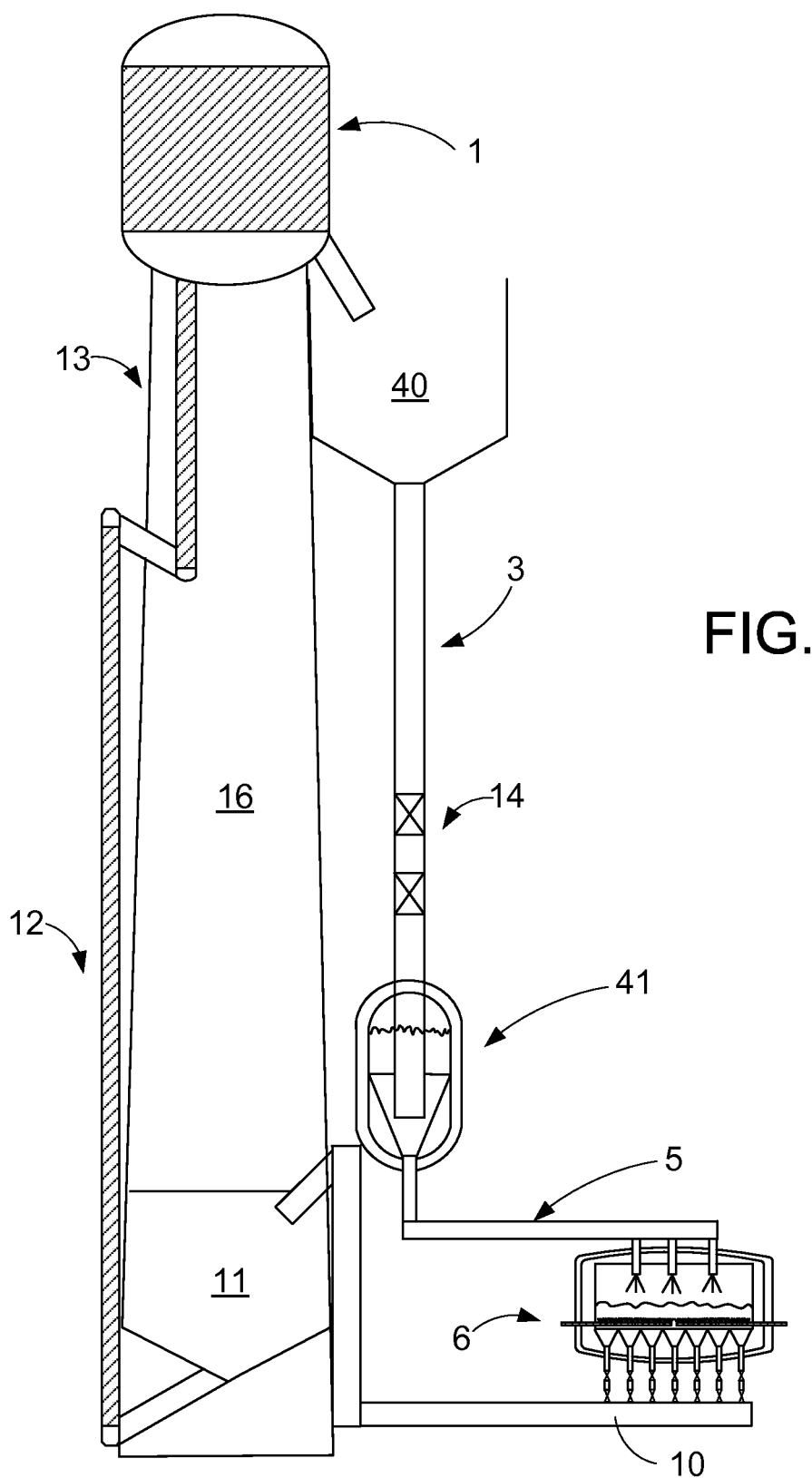
Figure 3:
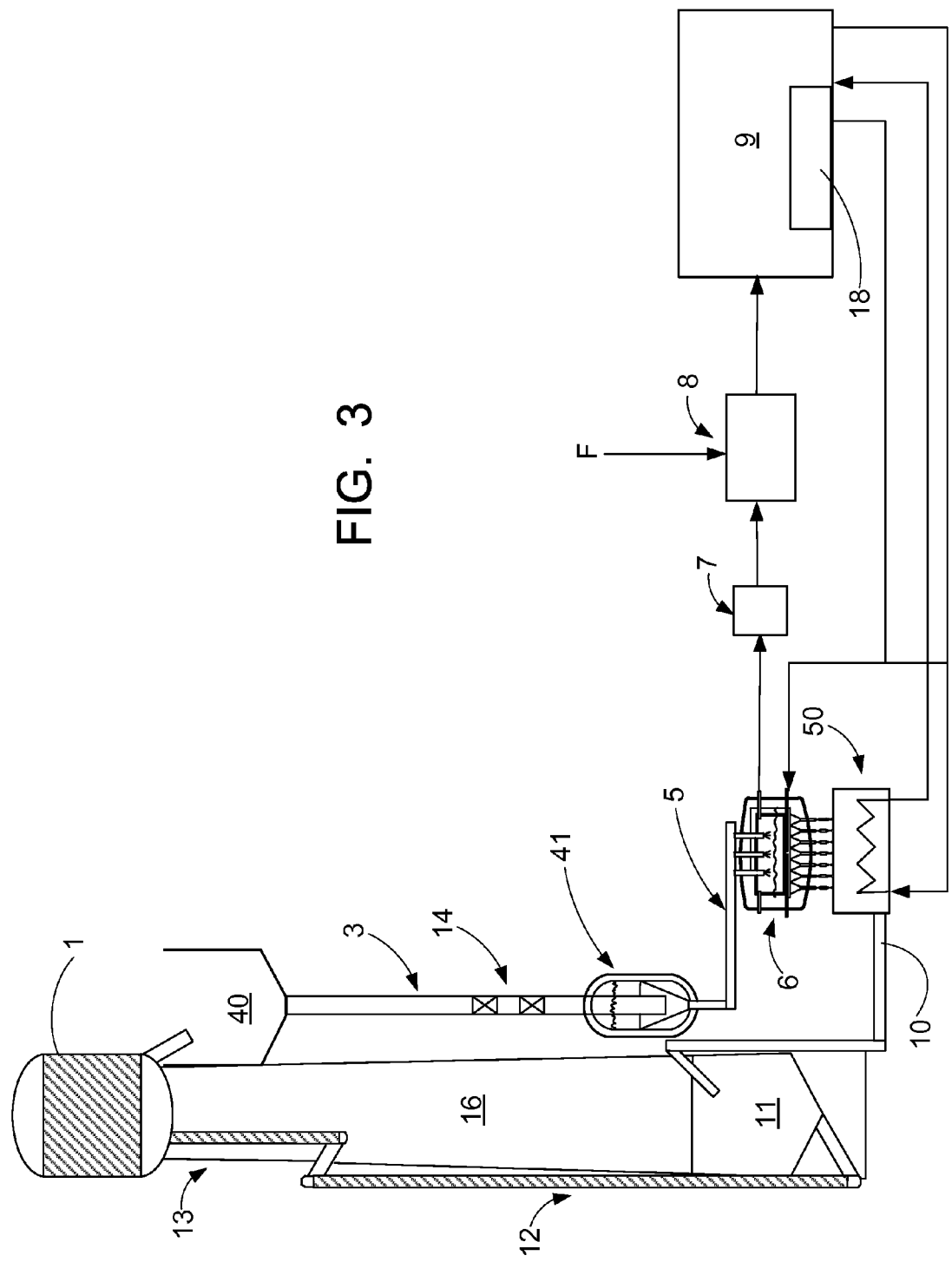

With reference now to FIGS. 2 and 3, some illustrative variant power plant embodiments are described.

FIG. 2 shows a variant configuration in which the pressurized hot silo 4 of the embodiment of FIG. 1 is replaced by an unpressurized hot silo 40 placed at a high elevation (that is, above the column of solid particles in the standpipe 3 that generates the elevated pressure P), and a smaller surge tank 41 at the bottom of the standpipe 3. Because the hot silo 40 is above the pressure-generating column of solid particles, the hot silo 40 of FIG. 2 can be designed to operate at atmospheric pressure and therefore does not need to be constructed as a pressure vessel. The surge tank 41 is at the bottom of the standpipe 3, and therefore does need to be constructed as a pressure vessel capable of withstanding the pressure P generated at the bottom of the standpipe 3. Although not shown in FIG. 2, the fluidization ring 17 described with reference to FIG. 1 may be incorporated into the surge tank 41 at the bottom of the standpipe 3 to inject aeration to agitate the solid particle inventory and prevent clogging at the bottom of the standpipe 3 to enable solids movement from the standpipe 3 to the surge tank 41. Alternatively, the surge tank 41 may be omitted completely, and the bottom of the standpipe 3 may be connected directly to the inlet of the L-valve 5. In this embodiment, the hot silo 40 serves as the surge tank to decouple flow control within the solar receiver system from the flow to the heat exchanger 6.

FIG. 3 is an alternative embodiment of the power plant of FIG. 2, and includes the elevated and unpressurized hot silo 40 and the surge tank 41 of the embodiment of FIG. 2. The embodiment of FIG. 3 further includes a solids cooler 50 in which the temperature of the solid particles discharged from the heat exchanger 6 is lowered further prior to returning to the cold silo 11. The energy extracted from the discharged particles by the solids cooler 50 is optionally integrated into the gas turbine cycle of the power plant by providing a heat exchanger in the solids cooler 50 that is coupled with the turbine 9. In a variant embodiment, heat recovered by the solids cooler may be used to drive another bottoming cycle which may be chosen from other potential power cycles such as another Brayton type cycle.

With reference now to FIGS. 4-7, some illustrative embodiments of the heat exchanger 6 are described, which are suitably employed as the heat exchanger 6 in conjunction with any of the illustrative power plants of FIGS. 1-3.

Figure 4:
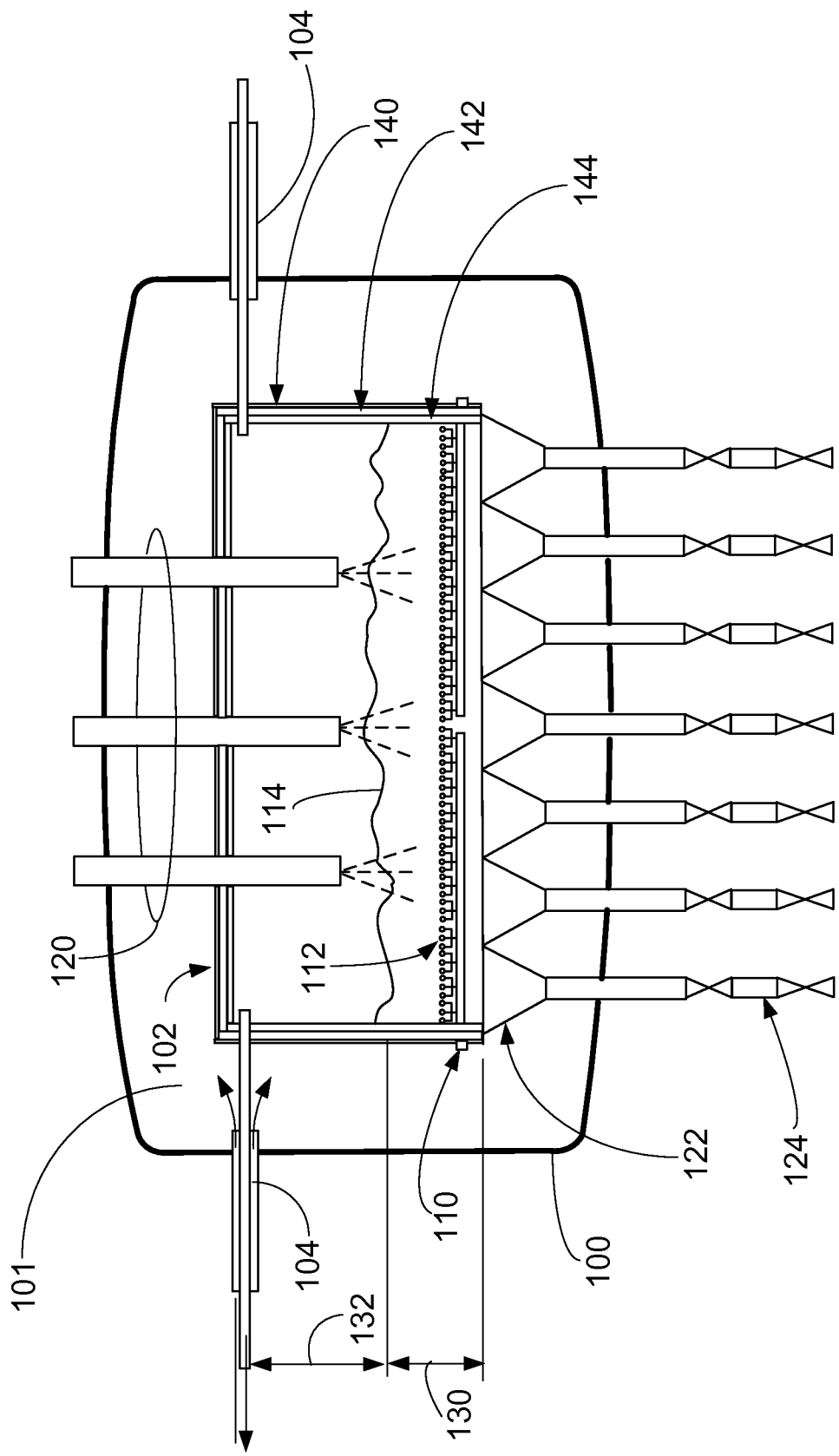
FIGS. 4-7 diagrammatically show pressurized fluidized heat exchanger beds suitably used in the power generation plants of FIGS. 1-3.

With reference to FIG. 4, a pressurized fluidized bed heat exchanger 6 includes an external shell 100 having the shape of a vertically oriented cylinder, which is a pressure vessel defining the main pressure boundary of the heat exchanger 6. An internal vessel 102 is disposed inside the vessel shell 100, with an air gap 101 between the internal vessel 102 and the vessel shell 100. The compressor 18 from the Brayton cycle supplies the air that contacts the hot solids in order to transfer heat to the air. This air is supplied from compressor 18 into nozzles 104 via vessel penetrations passing through the pressurized vessel 100. In the embodiment of FIG. 4, the nozzles 104 are in the form of coaxial pipes: cool air is input by flowing through the outside annulus of the coaxial pipe nozzle 104 into the pressure vessel 100, and heated air is discharged from the pressure vessel 100 via the inner pipe of the coaxial pipe nozzle 104. Arranging the cooler air in the outside annulus of the coaxial pipe nozzle 104 helps to keep the walls of the pressure vessel 100 cool (below 400° C. in some embodiments). While only two coaxial pipe nozzles 104 are depicted in FIG. 4, there may be a larger number of nozzles to provide uniform air flow. The cool air input from the compressor 18 via the outer annulus of the nozzle 104 enters the gap 101 between the pressure vessel 100 and internal vessel 102, and passes through passages or supply lines 110 in the internal vessel 102 that connect with distribution grid bubble caps 112 of a fluidized bed 114. The supply lines 110 penetrate the inner metal casing of the internal vessel 102 which separates the fluidized bed area from the pressure vessel 100. The air then penetrates through the bed 114 of particles and flows upward. At the same time, hot solid particles from the solar receiver 1 received via the hot silo 4 and L-valve 5 enter into the heat exchanger via solids supply nozzles 120 and flow downward. Heat transfers from the downward flowing solid particles to the upward flowing air so that the air is heated as it flows upward. At or near the top of the internal vessel 102, the hot air is collected from the inner pipes off the nozzles 104, which penetrate the top of the internal vessel 102. The collected hot air is sent to the particulate control device 7 and subsequently to the Brayton turbine 9 (optionally after going through the combustor 8) as already described with reference to FIG. 1.

The hot solids are delivered to the bed 114 by the solids supply nozzles 120 distributed across the bed plan area. An open-bottom fluidized bed arrangement allows the solid particles to flow down through the entire bed 114 to be collected in hoppers 122 and exit the pressurized vessel 100, for example using a lock-hopper type system 124. As previously described, the pressure seal at the top of the heat exchanger 6 is accomplished using the standpipe 3. For the solids exiting the bed via the hoppers 122, the temperature is substantially lower (due to heat transfer to the upward flowing air in the heat exchanger 6), and so a seal based on mechanical valves, such as the illustrative lock-hopper system 124, is suitable. Whereas each illustrative hopper 122 is depicted as having a downspout which penetrates through the bottom of the pressure vessel 100, an alternative design could combine the flow from multiple hoppers and exit the vessel using a common spout in order to minimize the penetrations through the pressure vessel. To obtain this arrangement, multiple spouts can be physically connected to each other, or individual L-valves could be used to combine the particles from multiple individual hoppers into common spouts.

A bed height 130 and a disengagement zone 132 are indicated in FIG. 4. The bed height 130 is maintained to allow good contact between the upward flowing air and the downward flowing solids, and to allow adequate residence time for solids to achieve the desired heat exchange to the air. The disengagement zone 132 provides a low velocity zone for the solid particles to separate from the air, which reduces the solid particle concentration in the air exiting the heat exchanger 6; and therefore, the amount of solid particles that must be removed in the particulate control device 7. The inner casing 102 is suitably lined with an erosion-resistant refractory material to protect the casing 102 from erosion as well as to provide thermal insulation. The inner casing 102 does not act as a pressure boundary, and accordingly can be manufactured with a relatively thin casing. The illustrative internal vessel 102 includes an outer metal casing 140, a middle insulating refractory layer 142, and an inner erosion-resistant refractory layer 144, but other casing configurations are contemplated. Alternatively, the side walls of the inner casing 102 can be lined with the erosion-resistant refractory scheme described above and the roof of the inner casing 102 can be lined with a light weight insulating refractory since the roof is not exposed to the abrasive solids mixing in the bed zone 130. This will reduce the weight and cost of the inner casing 102.

The illustrative air supply and exit lines are configured as coaxial pipe nozzles 104. This design allows the inlet air which is at a lower temperature to be on the outside providing a better match to the temperature of the wall of the pressure vessel 100 thereby reducing differential thermal expansion between the inlet pipe and vessel wall, and simplifying the materials selection and the weldments between the external pipe and vessel wall. This is also advantageous as it allows the penetration into the pressure vessel 100 to be at the same temperature as the vessel.

Figure 5:
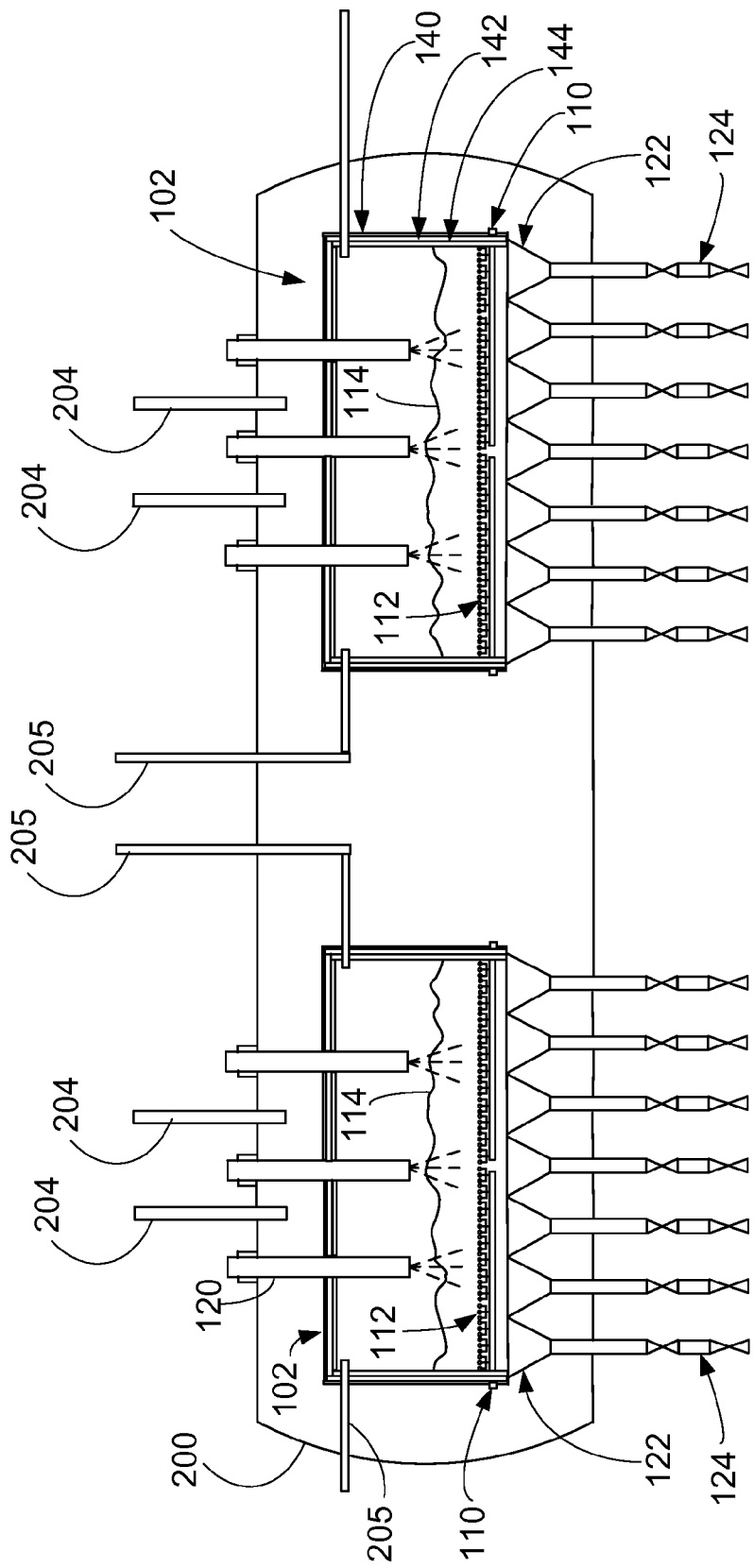

FIG. 5 depicts a pressurized heat exchanger in which the vertically oriented cylindrical pressure vessel 100 of the embodiment of FIG. 4 is replaced by a horizontally oriented cylindrical pressure vessel 200. This enables fitting a larger bed area into the pressure vessel 100 or, as illustrated in FIG. 5, enables inserting two (or more) interior vessels 102 arranged along the cylinder axis, each having its own fluidizing bed 114. The horizontal configuration also enables reduction in the diameter of the vessel 200 thereby reducing the thickness of the vessel. FIG. 5 also illustrates an alternative air-coupling embodiment, in which the coaxial pipe nozzles 104 of FIG. 4 are replaced by separate inlet nozzles 204 and discharge nozzles 205.

Figure 6:
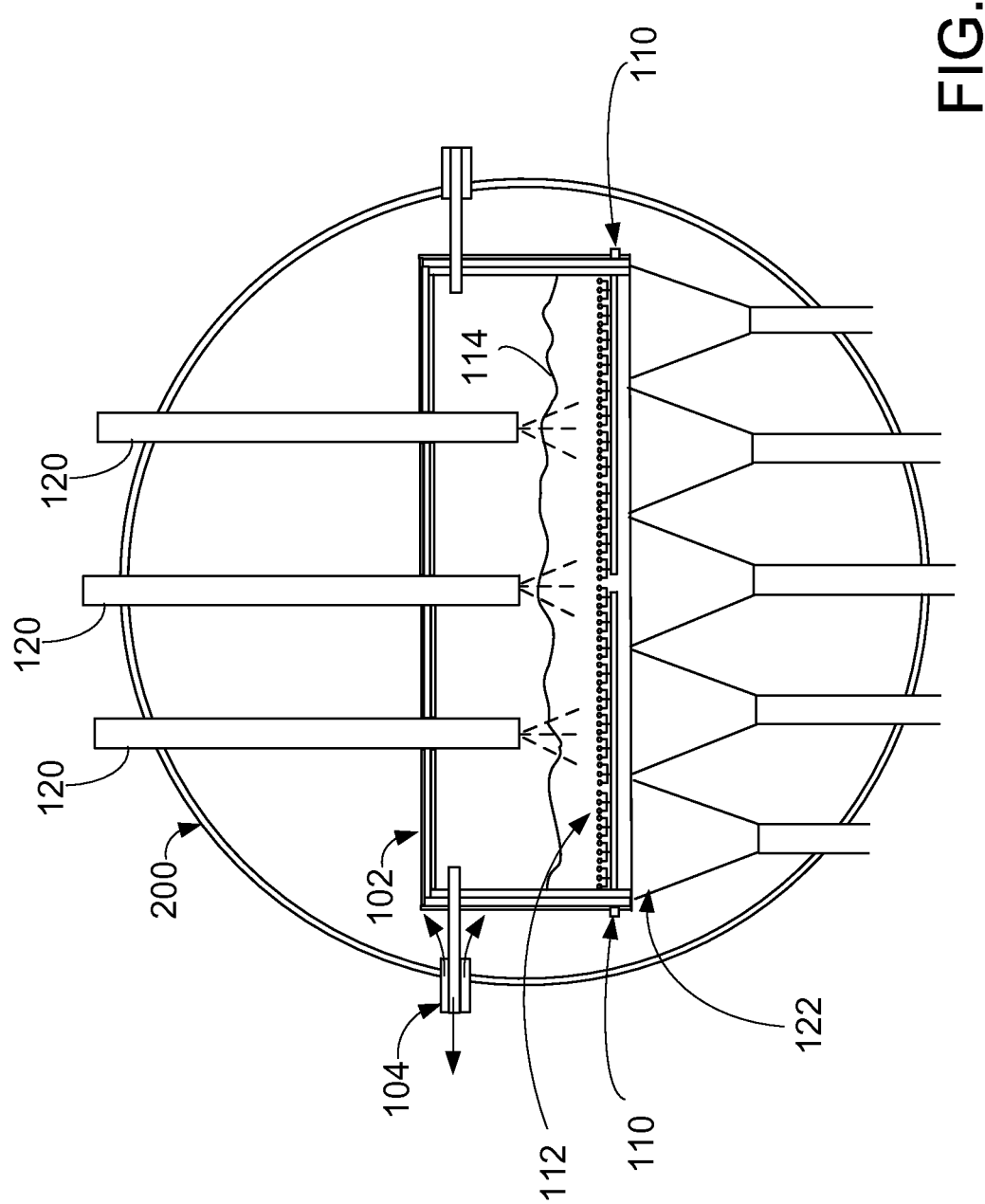

FIG. 6 shows a front view of a heat exchanger employing the horizontally oriented cylindrical pressure vessel 200 (that is, a view looking along the cylinder axis) in combination with the combined coaxial air inlet/discharge nozzles 104. As seen in FIG. 6, the horizontal cylindrical pressure vessel 200 naturally forms a (cylindrical) dome over the top of the interior vessel 102, which may be used to accommodate ancillary components such as a particulate separator (for example, a cyclonic particulate separator) to provide some or all particle removal additional to or in place of the separate particle control element 7 shown in FIG. 1.

Figure 7:
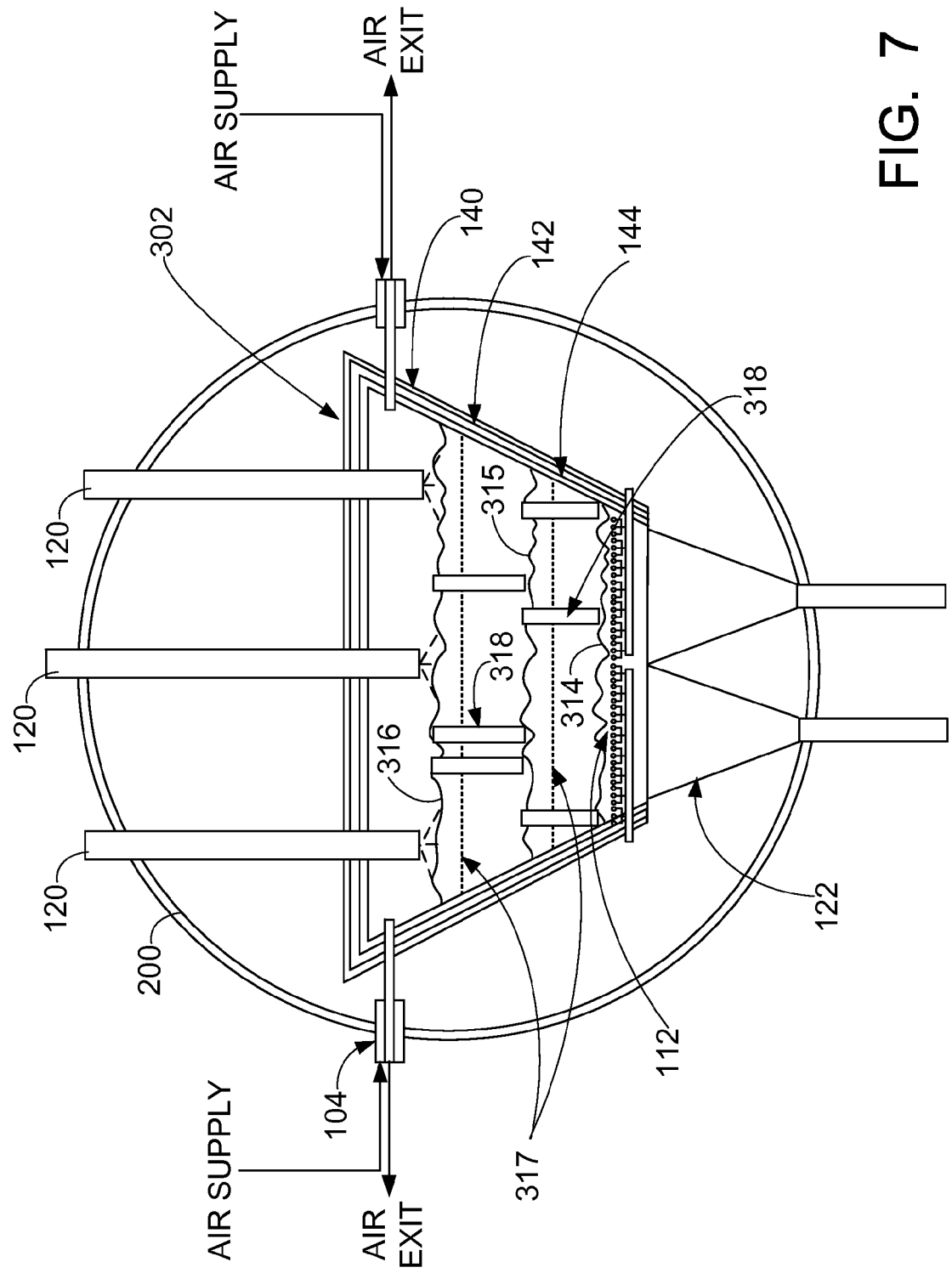

FIG. 7 shows a heat exchanger embodiment that again employs the the horizontally oriented cylindrical pressure vessel 200 (viewed in FIG. 7 along the cylinder axis as in FIG. 6), but with an alternative interior vessel 302 containing a plurality of bed layers 314, 315, 316 connected by downcomers 318. This design incorporates multiple layers 314, 315, 316 of beds which allow the heat exchanger to establish a countercurrent flow pattern between the solids and the gas (air or other working fluid at elevated pressure). The physical separation of beds 314, 315, 316 along the vertical direction is achieved using trays 317, perforated plates or stages or the like, and provides enhanced countercurrent flow and improved heat transfer between particles and gas. With a single bed layer (such as in the embodiments of FIGS. 4-6), the heat exchanger may be prone to experience significant vertical mixing leading to the air and solids reaching a common, lower mix temperature than that achievable with a multiple-bed design such as that shown in FIG. 7. A multiple-bed design suppresses vertical mixing by introducing multiple stages of contact within the interior vessel 302. As shown in FIG. 7, the cross-sectional area of the lower bed levels can be reduced (that is, the area of uppermost bed 316 is larger than the area of the middle bed 315 which is larger than the lowermost bed 314; this geometry is accommodated by illustrated inclined sidewalls of the interior vessel 302. The lower temperatures of the air at the lower bed levels means the velocities are lower for a given cross sectional area. The design criteria suitably uses velocities as a design measure, and thus lower temperatures of the lower beds allows for a reduction in area for a given design velocity. This design also assumes uniform solids mixing and therefore alleviates constraints on the gas velocities. Raising the gas velocities could allow for further reduction in the bed area across all stages so long as the solids carryover constraint is satisfied. The vertically stacked beds 314, 315, 316 and the reduction of bed area for lower beds allows the heat exchanger of FIG. 7 to be smaller/more compact as compared with the heat exchangers of FIGS. 4, 5, and 6, which provides benefits such as lower manufacturing cost, reduced weight and reduced component wall thicknesses, and may also enable using fewer hoppers 122 and fewer corresponding lock hopper systems, which also reduces the number of mechanical valves used in the cold solid particle removal system.

Further reduction in vessel size can be accomplished by separating the pressure vessel into multiple vessels each with its own interior vessel. The multiple vessels can be designed smaller to handle lower quantities of solids and gas, or the heat exchanger can be broken down such that each vessel may contain different parts of the exchanger (e.g. different heat transfer stages etc.). FIG. 5 shows the interior vessels 102 in a parallel flow arrangement. Alternatively, the interior vessels 102 could be connected in series i.e. where the hot air exiting a first interior vessel through pipe 205 is routed directly to the inlet 110 of a second interior vessel without exiting the pressure vessel 100.

With returning reference to FIG. 1 (or FIG. 2 or FIG. 3), there are certain constraints on the control of the power plant. To maintain the pressure P at the bottom of the standpipe 3, the column of solid particles in the standpipe 3 must be maintained at the height H providing that pressure P. At the same time, a sufficient flow rate of hot solid particles must flow into the heat exchanger 6 in order to maintain the Brayton (or other thermodynamic) cycle operating at a desired energy output.

In one illustrative control approach operating in conjunction with the illustrative power plant of FIG. 1, the following control parameters (inputs) are monitored, and control points maintained. The outlet temperature of solids from the solar receiver 1 is monitored with thermocouples. A set point for the solids temperature exiting the solar receiver 1 is established. The flow rate of solids through the solar receiver 1 is regulated by the speed of the first stage of bucket elevators 12 that lift the solids from the cold silo 11 to the solar receiver 1. The second stage of bucket elevators 13 operates at a sufficiently high speed to transfer all the solids from the first bucket elevator 12 when operated at the maximum solids flow rate. Solids discharged from the solar receiver 1 are transferred to the collector 2 (or series of collectors) which discharge solids to the standpipe 3, which transfers the hot solids to the hot silo 4. The hot silo 4 is equipped with an internal dipleg surrounded by a coaxial pipe with the fluidizing ring 17 at the base, and aeration air is provided to the fluidizing ring 17 so that all solids captured by the collector 2 can be stored in the hot silo 4. The flow rate of aeration air into the fluidizing ring 17 is adjusted to transfer the excess solids captured by the collector 2 to the annular volume of the hot silo 4 while maintaining the target level (or height H) of solids in the standpipe 3 to maintain the desired pressure seal. These control operations regulate operation of the solar receiver 1.

In one illustrative contemplated control approach, the control is configured as five primary control loops or points. Various components in the system are designed so as not to be limiting in the transfer of solids from one subsystem or component to the next. At a first control point, the particle level in the distribution hopper at the top of the solar receiver 1 (detail not shown in FIG. 1) is regulated by the speed of the first stage of bucket elevators 12 that lift the solids from the cold silo 11 to the solar receiver 1. The speed of the bucket elevators 12 is adjusted to maintain a target particle level in the distribution hopper at the top of the solar receiver 1 as measured by a series of level detectors around the circumference of the hopper.

At a second control point, the flow rate of solids through the solar receiver 1 is regulated by a series of hopper valves on the bottom of the distribution hopper located around the circumference of the solar receiver 1. The operation of the hopper valves is adjusted to maintain a target particle temperature at the discharge of the solar receiver 1 as measured by a series of thermocouples (or other temperature sensors) located around the circumference of the solar receiver 1. The operation of individual hopper valves can be adjusted to regulate the discharge temperature of the particles in the vertical section of the receiver serviced by the specific hopper valve.

At a third control point, the hot silo 4 is equipped with an internal dipleg surrounded by a coaxial pipe with the fluidizing ring 17. Aeration air is provided to the fluidizing ring 17 so that all solids captured by the collector 2 can be stored in the hot silo 4. The flow rate of aeration air is adjusted to transfer the excess solids captured by the collector 2 to the annular volume of the hot silo 4 while maintaining a target level of particles in the standpipe 3 to maintain the pressure seal.

At a fourth control point, the flow rate of hot particles through the heat exchanger 6 is increased or decreased by adjusting the aeration air flow to the L-valve 5 to maintain the target outlet temperature and flow rate of air in response to a demand signal for electrical power from the gas turbine power generation system 9.

At a fifth control point, the bed drain valves of the heat exchanger 6 are cycled to maintain the target bed level in the heat exchanger 6 as the particle flow through the heat exchanger 6 increases or decreases as a function of the demand signal for electrical power.

At a sixth control point, a combustible mixture of air and natural gas (or other gaseous fuel) is fed through the hot silo aeration ring 17 to provide additional solids heating to attain the desired target temperature for the pressurized heat exchanger 6. Since the solid particles are above the auto-ignition temperature of a combustible mixture of air and natural gas, the natural gas will ignite and provide additional heat to the solid particles.

More particularly, control related to the Brayton cycle involving the heat exchanger 6 and gas turbine power generation sub-system 9 is suitably performed as follows. A load demand from the process is established. A target outlet temperature and flow rate of air from the heat exchanger 6 is established consistent with the load demand. The air flow through the heat exchanger 6 is increased in response to the air flow demand set point. The solids flow through the heat exchanger 6 is increased by increasing the aeration air flow to the L-valve 5 to maintain the target air outlet temperature. The heat exchanger 6 bed drain valves are cycled to maintain the design bed level in the heat exchanger 6. The solids transfer system is operated at a single speed to accommodate the maximum flow rate required to transfer all solids from the bottom of the heat exchanger 6 bed drain system to the cold silo 11.

The disclosed power plants integrating concentrated solar power (CSP) with a pressurized heat exchanger provide high thermal-to-electric conversion efficiencies which can be leveraged to reduce the footprint of the mirror field (heliostat field), and has numerous other advantages. Where natural gas combustion is performed by the combustor 8, the air heated by both the heat exchanger 6 and the combustor 8 enables achieving higher gas turbine inlet temperatures and consequently higher efficiencies than a typical CSP plant operating with steam and or molten salt as the heat transfer fluid. The disclosed integrated system also provides the ability to store energy in the form of thermal energy stored in the hot solid particles in the hot silo 4, which can later be used to produce power after sundown or at other times when solar energy availability is curtailed. The disclosed integrated power plant advantageously integrates the solar receiver 1 with the turbine block 9 which is similar to a natural gas-combined cycle turbine block comprising of a Brayton turbine (cycle) and a steam turbine cycle. While the ideal system would incorporate a steam turbine island in addition to the Brayton turbine, the system offers the ability to generate power solely on the Brayton turbine if the plant cannot support a steam-based system.

The heat exchanger 6 used to extract heat from the hot particles is suitably a pressurized direct contact heat exchanger, which provides further advantages. The heat exchanger 6 is a mildly fluidized bed that allows the system to achieve an overall countercurrent flow of air and particles to maximize energy extraction from the particle into the air. In order to maintain the pressure in the heat exchanger 6, in the embodiment of FIG. 1 the hot silo 4 and the standpipe 3 are under pressure as well. A column of solid particles of designed height H is maintained in the standpipe 3 to provide the sealing pressure P at the bottom of the standpipe 3. The height H of solids in the standpipe 3 is the main mechanism of sealing against the pressure in the pressurized heat exchanger 6 and the pressure in the hot silo 4. The height of the standpipe 3 (which places a maximum constraint on the column height H), the operating temperature and selection of particles are factored into determining the design height H of the solids level that is maintained to allow operation of the heat exchanger 6 at a given pressure. Therefore the system offers the means to achieve the desired pressures in the fluidized bed heat exchanger 6 without requiring a lock hopper design operating on the hot solid particles output by the solar receiver 1.

In the illustrative embodiment, the L-valve 5 (or another non-mechanical, aeration-operated valve) is used to control feed of the hot particles into the heat exchanger 6. In an alternative embodiment, a lock-hopper type of system can be used to feed in solid particles and take out particles while allowing the heat exchanger 6 to operate at the desired pressure. The hot silo 4 is designed (in the embodiment of FIG. 1) to maintain the pressure, create a seal around the standpipe 3 and allow particles to flow down the standpipe 3 and fill up the hot silo 4. The silo optionally includes one or more fluidization nozzles 17 around the bottom of the standpipe 3 in order to allow the particle to flow downwards from the standpipe 3 and flow upwards around the periphery or adjacent to the bottom of the standpipe 3 to fill up the pressurized hot silo 4. In alternative embodiments of FIGS. 2 and 3, the hot silo 40 is not pressurized and is located at higher elevation, which eliminates the need for the high-volume capacity pressure vessel defining the hot silo 4 of the embodiment of FIG. 1. In these alternative designs, a smaller surge vessel 41 provides buffering of the solid particle flow between the solar receiver 1 and the heat exchanger 6, or alternatively the hot silo 40 can serve as the surge vessel.

The pressure in the hot silo 4 or surge vessel 41 is optionally further maintained by a pressure regulating control valve (such as a pressure regulating valve or regulated vent valve, with illustrative hot filter 15) of the hot particle silo 4 or surge vessel 41. This allows the system to vent out the excess air buildup from the fluidization air or from air that comes into the silo or surge vessel from the L-valve 5 (or loop seal or J-valve). If excess air is not properly purged from the hot silo, the pressure in the hot silo will increase, thereby inhibiting the flow of solids down the standpipe or through the annulus zone within the hot silo by exerting a back pressure on the solids in these zones. The proper control of the pressure within the hot silo is facilitates maintaining an overall system pressure balance to promote smooth flow of particles around the system. The pressure control valve may be placed preferentially after a hot particle filter 15 (or other particulate control device) in order to operate in a particle free (low particulate) environment and potentially at lower temperature. Alternatively these valves may be placed ahead of the particulate control device.

Some further embodiments are presented in the following as further examples.

In one embodiment, a concentrated solar power solids-based system may be provided, comprising: a solar receiver, a heated solids storage, a pressurized heat exchanger, a valve arranged to feed heated solids to the pressurized heat exchanger. A gaseous medium is supplied to the pressurized heat exchanger, and cooled solids from the pressurized heat exchanger are transported to the solar receiver. A gas turbine is driven by the gaseous medium heated in the pressurized heat exchanger. Fine solids from the gaseous medium are collected leaving the pressurized heat exchanger using suitable particulate control component(s). The solids storage is pressurized (for example, configured as pressurized hot silo). A standpipe is located in the path of the heated solids from the solar receiver to the pressurized heated solids storage. The height of the standpipe is sufficient to allow maintaining a column of solid particles of height H sufficient to provide a seal against the pressure in the heated solids storage. In such a system, the standpipe may be at least partially surrounded by the pressurized heated solids storage, and the solids in the proximity of the bottom of the standpipe may be fluidized. A conduit may be provided to connect the fluidizing ring or other fluidizing element with a higher elevation within the pressurized heated solids storage. The pressurized heated solids storage may be equipped with a vent for the fluidizing medium (e.g. air) used in fluidizing in the vicinity of the bottom of the standpipe. The vent may comprise a filter or other particulate control device for collecting fine solids from the fluidizing medium leaving the pressurized heated solids storage. The vent may be connected to the upper part of the pressurized heat exchanger. The pressurized heat exchanger may comprise a single bed, or may comprise a stack of beds on trays or the like, each tray supporting a bed of solids and providing a uniform distribution of the gaseous medium through the bed. The trays are suitably connected by downcomer tubes or the like to allow the solids to flow downward through the stack of trays and to allow air or other working gas at elevated pressure to flow upward consecutively through the trays resulting in the solids-to-gas counterflow. The solids are fluidized on at least one of the trays. The solids are suitably fed from the pressurized heated solids storage onto the top of the bed on the uppermost tray. The solids may be fed through at least two feed points uniformly distributed across the plan area of the uppermost bed. The solids are removed from the pressurized heat exchanger through at least one discharge port located below the lowermost tray. The at least one discharge port may comprise a seal against the pressure in the pressurized heat exchanger. The particulate control device for collecting fine solids from the gaseous medium may include a filter comprising high temperature resistant material with fine pores. The respective elevations of the components of the system are configured to enable solids to move from the solar receiver through the pressurized heat exchanger by gravity. Metering of solids from the heated solids storage to the heat exchanger is suitably accomplished by a non-mechanical valve, such as an L-valve. The feeding of heated solids to the heat exchanger may include a safety section preventing solids throughput unless the solids in the section are fluidized. The concentrated solar power solids-based system may further include a combustor, e.g. a burner, to further heat up the air or other gaseous medium in a conduit between the pressurized heat exchanger and the gas turbine.

In another embodiment, a concentrated solar power solids-based system may be provided, comprising a solar receiver, a heated solids storage, a pressurized heat exchanger, a means for feeding heated solids to the pressurized heat exchanger, a means for supplying a gaseous medium to the pressurized heat exchanger, a means for transporting cooled solids from the pressurized heat exchanger to the solar receiver, a gas turbine driven by the gaseous medium heated in the pressurized heat exchanger, a means for collecting fine solids from the gaseous medium leaving the pressurized heat exchanger, and a means for providing a seal between the heated solids storage and the pressurized heat exchanger. The means for providing a seal may comprise mechanical valves, such as lock-hoppers, rotary valves, or double flapper valves. The solid particles may in some embodiments comprise at least one of: sand, high silica sand, quartz, alumina, alumino-silicates, calcined flint, iron titanate, bauxite, clays, hematite, and ilmenite.

Illustrative embodiments including the preferred embodiments have been described. While specific embodiments have been shown and described in detail to illustrate the application and principles of the invention and methods, it will be understood that it is not intended that the present invention be limited thereto and that the invention may be embodied otherwise without departing from such principles. In some embodiments of the invention, certain features of the invention may sometimes be used to advantage without a corresponding use of the other features. Accordingly, all such changes and embodiments properly fall within the scope of the following claims. Obviously, modifications and alterations will occur to others upon reading and understanding the preceding detailed description. It is intended that the present disclosure be construed as including all such modifications and alterations insofar as they come within the scope of the appended claims or the equivalents thereof.

We claim:

1. A power plant comprising:
    a solar receiver configured to heat solid particles;
    a standpipe extending downward from the solar receiver to receive solid particles from the solar receiver, the standpipe having a height sufficient to support a column of heated solid particles of height H;
    a pressurized heat exchanger configured to operate at an elevated pressure higher than atmospheric pressure to heat working fluid flowing through the pressurized heat exchanger by heat transfer from heated solid particles flowing out of the bottom of the standpipe; and
    a flow path for solid particles from the bottom of the standpipe into the pressurized heat exchanger that is configured to be sealed by a pressure P produced at the bottom of the standpipe by a column of heated solid particles of the height H, the flow path comprising a silo or surge tank that forms a pressure vessel connected to the bottom of the standpipe, wherein the silo or surge tank includes at least one fluidization nozzle disposed in the silo or surge tank and configured to output working fluid to agitate a solid particle inventory in the silo or surge tank.

2. The power plant of claim 1 wherein the fluidization nozzle comprises a ring disposed around the bottom of the standpipe.

3. The power plant of claim 1 wherein the flow path further includes:
a non-mechanical valve having no moving parts and operating by agitation of solid particles in the valve by flow of working fluid.

4. The power plant of claim 1 further comprising:
a turbine operatively connected with the pressurized heat exchanger to be driven by heated working fluid discharged from the pressurized heat exchanger; and
a compressor driven by the turbine to drive working fluid through the pressurized heat exchanger to define a thermodynamic cycle driven at least in part by concentrated solar power (CSP) comprising thermal energy deposited in the solid particles heated by the solar receiver.

5. The power plant of claim 1 wherein the solar receiver comprises:
an annular volume through which granular solid particles flow downward; and
light-channeling tubes having apertures at the outer surface of the annular volume to receive light from a heliostat field and extending into the annular volume so that the downward flowing granular solid particles pass over the light-channeling tubes to absorb solar thermal energy.

6. The power plant of claim 1 wherein the flow path includes:
a non-mechanical valve having no moving parts and operating by agitation of solid particles in the valve by flow of working fluid.

7. The power plant of claim 1 further comprising:
a turbine operatively connected with the pressurized heat exchanger to be driven by heated working fluid discharged from the pressurized heat exchanger; and
a compressor driven by the turbine to drive working fluid through the pressurized heat exchanger to define a thermodynamic cycle driven at least in part by concentrating solar power (CSP) comprising thermal energy deposited in the solid particles heated by the solar receiver.

8. The power plant of claim 7 further comprising:
a combustor configured to add heat to the heated working fluid discharged from the pressurized heat exchanger prior to driving the turbine.

9. The power plant of claim 7 wherein the solar receiver comprises:
an annular volume through which granular solid particles flow downward; and
light-channeling tubes having apertures at the outer surface of the annular volume to receive light from a heliostat field and extending into the annular volume so that the downward flowing granular solid particles pass over the light-channeling tubes to absorb solar thermal energy.

10. The power plant of claim 7 wherein the compressor driven by the turbine to drive working fluid through the pressurized heat exchanger defines a Brayton cycle driven at least in part by CSP comprising thermal energy deposited in the solid particles heated by the solar receiver.

11. The power plant of claim 7 wherein the pressurized heat exchanger comprises a pressurized fluidized bed heat exchanger.

12. The power plant of claim 1 wherein the pressurized heat exchanger comprises a pressurized fluidized bed heat exchanger.

13. The power plant of claim 1 wherein the pressure P is at least 5 atm.

14. A method comprising:
heating solid particles in a solar receiver;
forming heated solid particles discharged by the solar receiver into a stack of height H by gravity feed from the solar receiver into a silo or surge tank that includes at least one fluidization nozzle disposed in the silo or surge tank and configured to output working fluid to agitate a solid particle inventory in the silo or surge tank;
transferring solid particles from the bottom of the stack of height H into a pressurized heat exchanger wherein the transferring includes sealing a flow path from the bottom of the stack of height H into the pressurized heat exchanger by pressure produced by the weight of the stack of height H; and
in the pressurized heat exchanger, transferring heat from the solid particles to a working fluid at an elevated pressure of at least 5 atm.

15. The method of claim 14 further comprising:
driving a turbine using the working fluid heated by the transfer of heat from the solid particles in the pressurized heat exchanger; and
circulating the working fluid through the pressurized heat exchanger using a compressor driven by the turbine whereby a thermodynamic cycle is defined that is driven by the heating of solid particles in the solar receiver.

16. The method of claim 15 further comprising:
further heating by a combustion process the working fluid heated by the transfer of heat from the solid particles in the pressurized heat exchanger;
wherein the thermodynamic cycle is further driven by the further heating by the combustion process.

17. The method of claim 16 wherein the combustion process is performed at one or more of:
the pressurized heat exchanger,
a combustion chamber separate from the pressurized heat exchanger,
a storage tank at the bottom of the stack of height H, and
a turbine driven using the working fluid heated by the transfer of heat from the solid particles in the pressurized heat exchanger.

18. A concentrated solar power solids-based system comprising:
a solar receiver configured to heat a granulated solid medium comprising granulated solid particles;
a pressurized heated solids storage configured to store the granulated solid medium after heating by the solar receiver, wherein at least one fluidizing nozzle is located in the pressurized heated solids storage;
a pressurized heat exchanger configured to transfer heat from the granulated solid medium to a gaseous medium;
a flow path connected to feed the granulated solid medium heated by the solar receiver to the pressurized heat exchanger;

a compressor connected to supply the gaseous medium to the pressurized heat exchanger;

a conveyor configured to transport the granulated solid medium after heat transfer to the gaseous medium in the pressurized heat exchanger from the pressurized heat exchanger to the solar receiver;

a gas turbine operatively connected to be driven by the gaseous medium heated in the pressurized heat exchanger; and a standpipe disposed in the path of the granulated solid medium from the solar receiver to the pressurized heated solids storage;

wherein the standpipe has a height sufficient to hold a stack of granulated solid medium of height H that is sufficient to provide a seal against the pressure in the heated solids storage.

19. The concentrated solar power solids-based system of claim 18, wherein the bottom end of the standpipe is at least partially surrounded by the pressurized heated solids storage.

20. The concentrated solar power solids-based system of claim 18 further comprising a conduit connecting the at least one fluidizing nozzle with a higher elevation of the pressurized heated solids storage.

21. The concentrated solar power solids-based system of claim 18, wherein the pressurized heat exchanger comprises a stack of trays, each tray supporting a bed of solids, the trays connected to allow the granulated solid medium to flow downward through the trays and the gaseous medium to flow upward through the trays.

22. The concentrated solar power solids-based system of claim 21, wherein the solids are fluidized on at least one of the trays.

23. The concentrated solar power solids-based system of claim 22, wherein the solids are removed from the pressurized heat exchanger through at least one discharge port located below the lowermost tray that comprises a seal against the pressure in the pressurized heat exchanger.

24. The concentrated solar power solids-based system of claim 18, further comprising a non-mechanical valve configured to meter flow of the granulated solid medium from the heated solids storage to the heat exchanger by controlling a flow of the gaseous medium in the non-mechanical valve.

25. The concentrated solar power solids-based system of claim 18, further comprising a combustor that combusts fuel to further heat up the gaseous medium in the conduit between the pressurized heat exchanger and the gas turbine.

26. The concentrated solar power solids-based system of claim 18 wherein the granulated solid medium comprising granulated solid particles comprises at least one of: sand, high silica sand, quartz, alumina, alumino-silicates, calcined flint, iron titanate, bauxite, clays, hematite, ilmenite.

27. The concentrated solar power solids-based system of claim 18 wherein the flow path connected to feed the granulated solid medium heated by the solar receiver to the pressurized heat exchanger comprises a safety section preventing solids throughput unless the solids in the section are fluidized.

28. The power plant of claim 1, wherein the pressurized heat exchanger comprises a horizontally-oriented cylindrical pressure vessel.

29. The power plant of claim 28, wherein the pressurized heat exchanger further comprises coaxial inlet/discharge nozzles.

30. The power plant of claim 28, the pressurized heat exchanger is a fluidized bed heat exchanger; and wherein the fluidized bed heat exchanger comprises a plurality of bed layers separated by perforated plates or stages.

* * * * *